July 26, 1949.　　　　W. W. PAGET　　　　2,477,003
ROTARY HELICAL GEAR AIR PUMP WITH
DISCHARGE PRESSURE REGULATOR
Original Filed July 25, 1942　　　　8 Sheets-Sheet 1
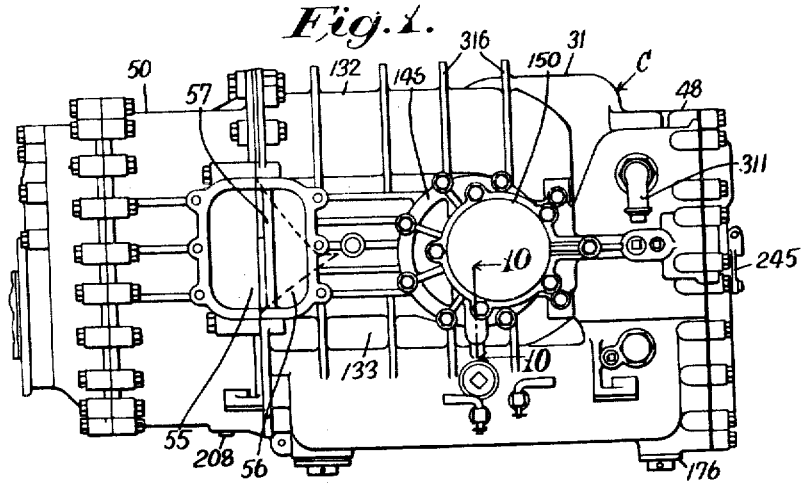
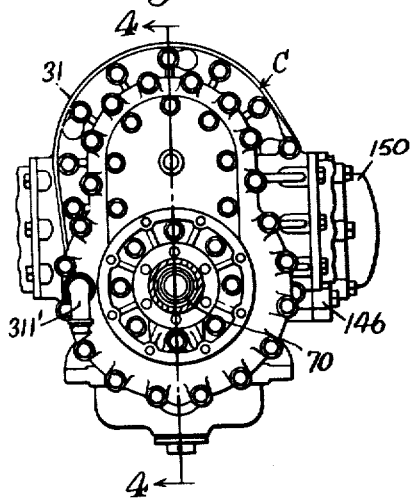
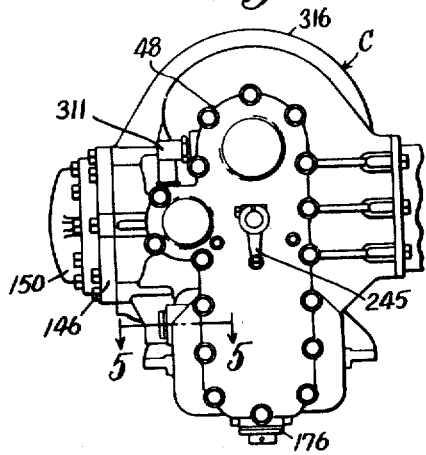
Inventor:
Win W. Paget.
by
atty.

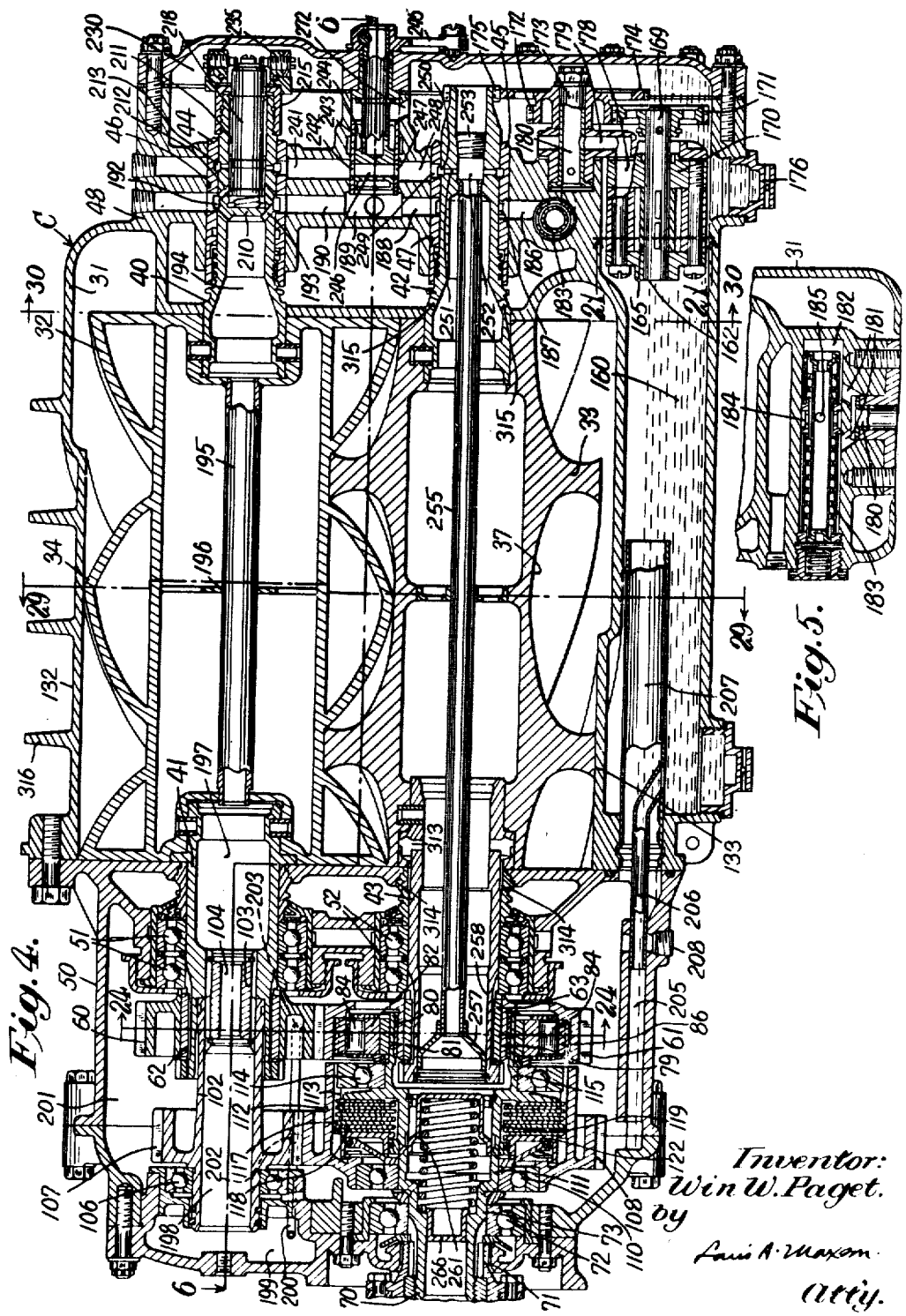

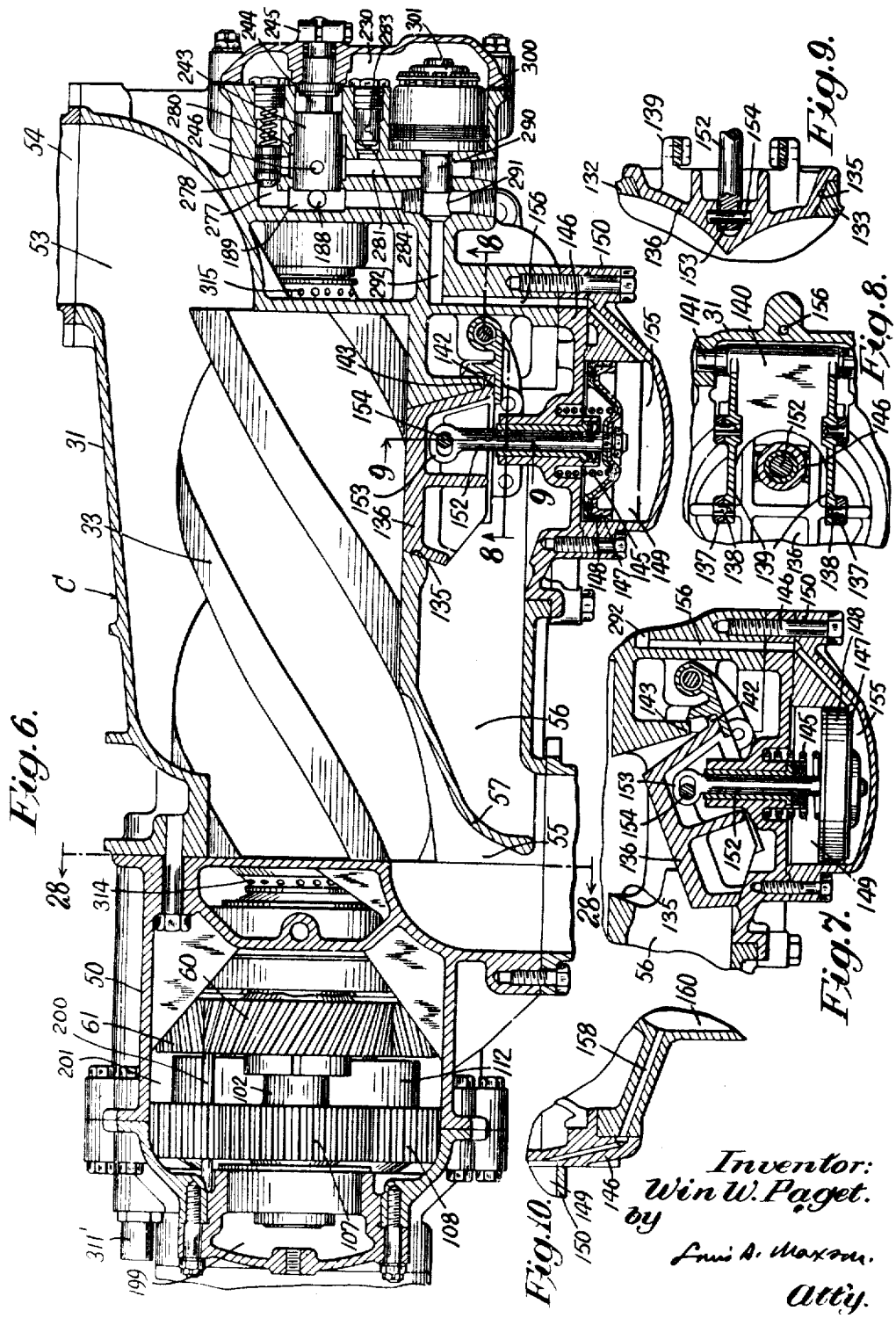

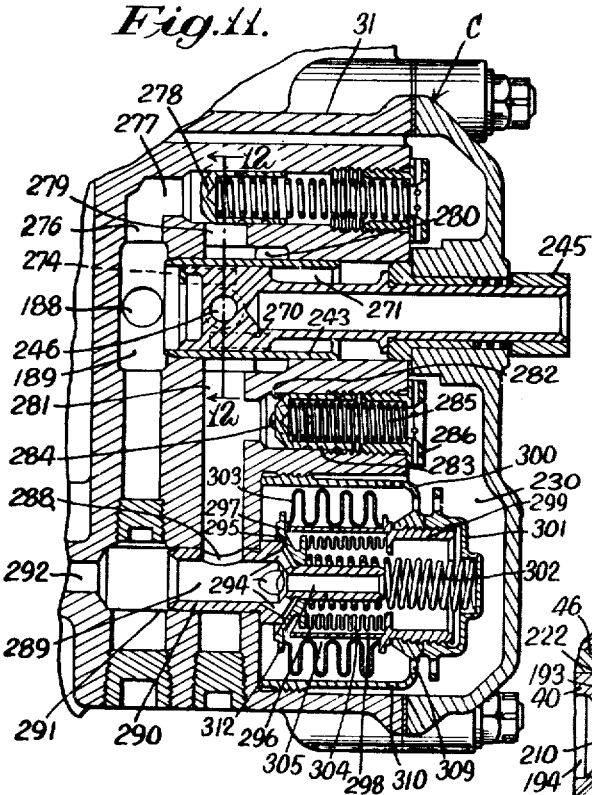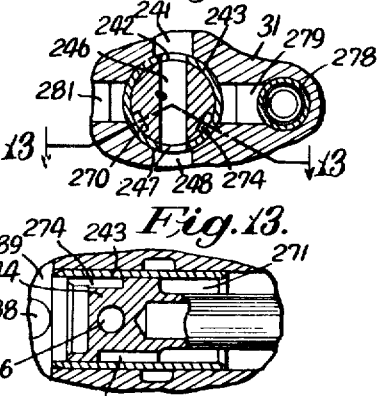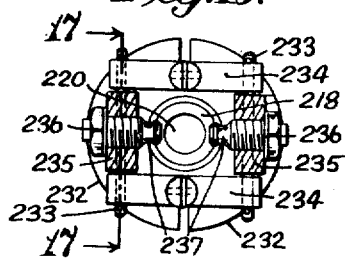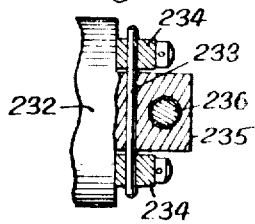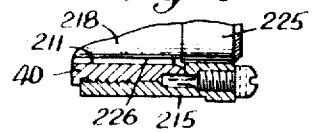

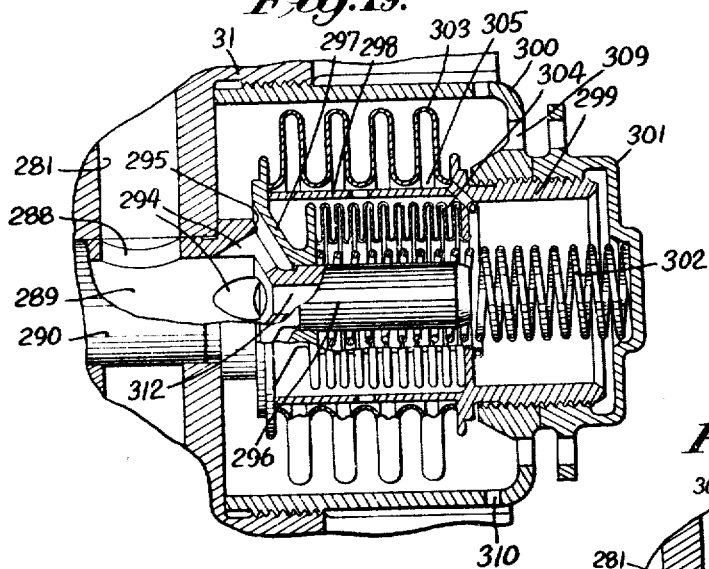
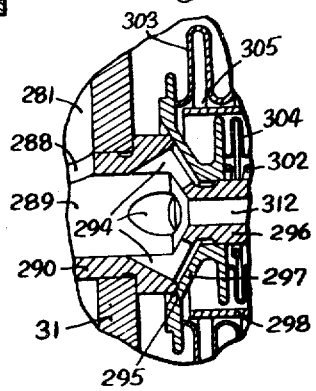
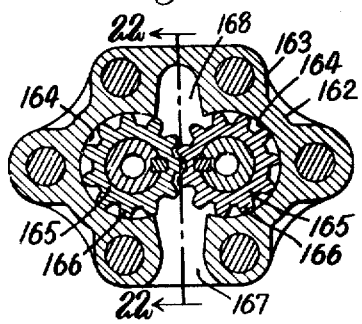
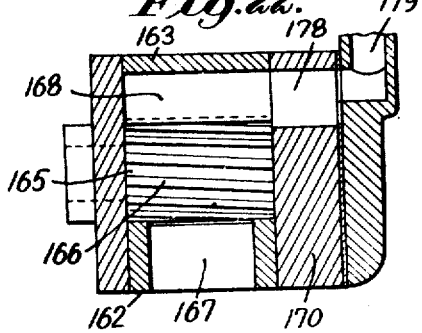

July 26, 1949.　　　　W. W. PAGET　　　　2,477,003
ROTARY HELICAL GEAR AIR PUMP WITH
DISCHARGE PRESSURE REGULATOR
Original Filed July 25, 1942　　　　8 Sheets-Sheet 6
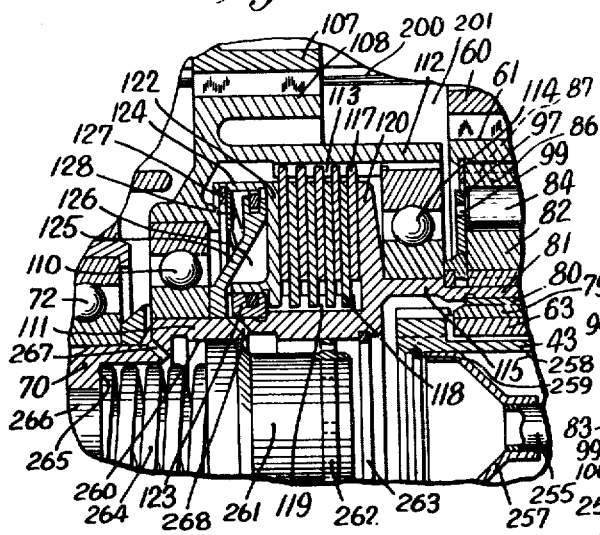
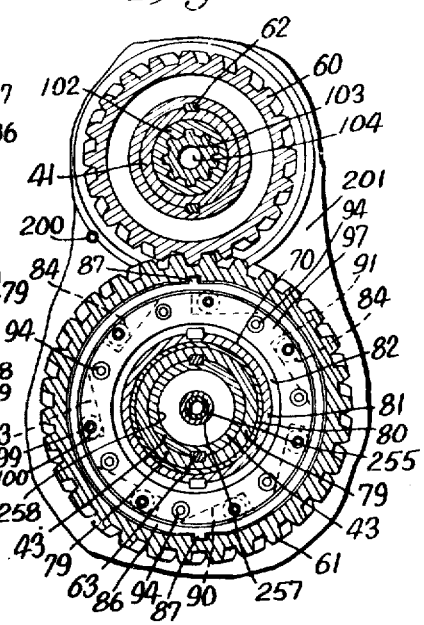
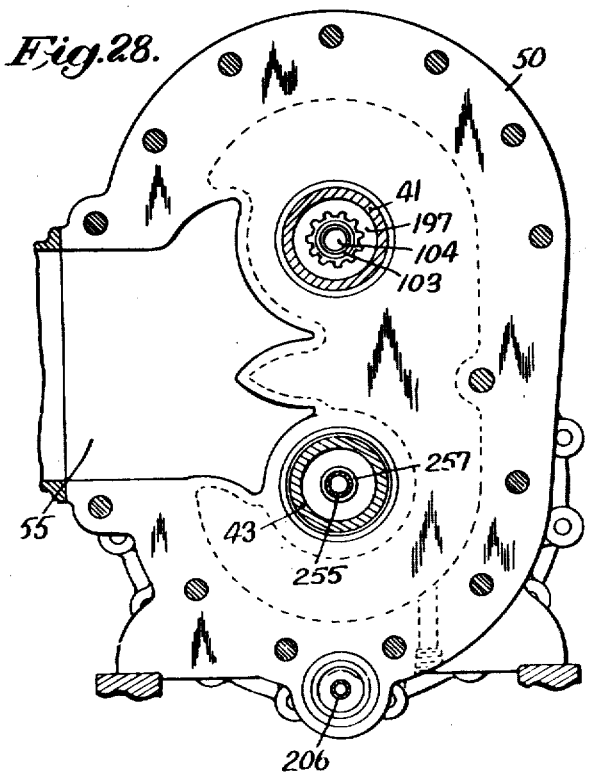
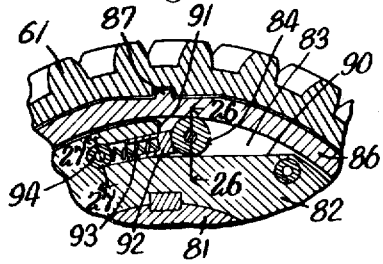
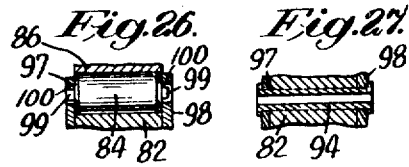
Inventor:
Wm. W. Paget.
by
Louis A. Maxon.
atty.

Inventor:
Win W. Paget.
by
Louis A. Maxson.
atty.

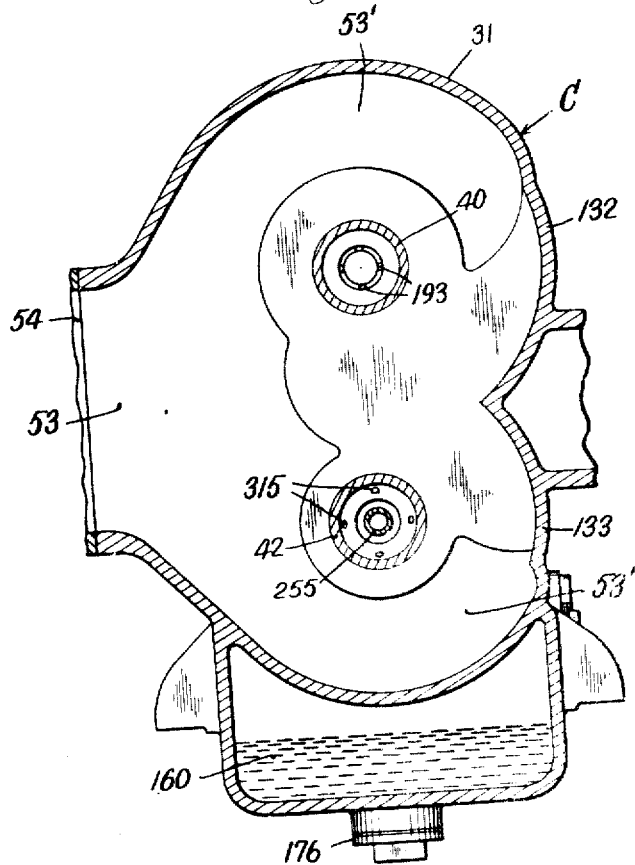

Patented July 26, 1949

2,477,003

UNITED STATES PATENT OFFICE 2,477,003

ROTARY HELICAL GEAR AIR PUMP WITH DISCHARGE PRESSURE REGULATOR

Win Withers Paget, Michigan City, Ind., assignor to Joy Manufacturing Company, a corporation of Pennsylvania Original application July 25, 1942, Serial No. 452,299. Divided and this application September 17, 1942, Serial No. 458,641

4 Claims. (Cl. 230—138)

My invention relates to air pumping apparatus, and more particularly to apparatus for the maintenance of adequate pressure conditions in the cabins or other passenger compartments of airplanes which are adapted to be operated at widely varying altitudes, including high altitudes.

As is well known, it is necessary or at least highly desirable, in order that a plane may obtain the advantages of high altitude flight, to make special provision for the safety and comfort of the pilot and/or passengers. For this purpose supercharged cabins and other passenger compartments present particular advantages. While a mere displacement pump may serve satisfactorily under certain ranges of altitude as an air delivery device for a cabin or other compartment, a pump cable of the actual compression of air is more satisfactory for high altitude flight. It is desirable, in the provision of a pumping apparatus of the compressor type, to provide a pump which shall have a large displacement in small compass, which shall be able actually to compress the air taken in through one or more compressions prior to discharge; to provide a pump which at many altitudes shall avoid the consumption of unnecessary power and the needless generation of heat by operating as, or substantially as, a mere air displacement device; to provide a pump whose speed of operation shall be automatically varied in accordance with predetermined changes in engine speed; to provide a pump which shall automatically change its characteristics from a simple air displacement apparatus to a true compressor when certain conditions obtain, such as, for example, the elevation of the apparatus to a height where the external pressure falls below a predetermined value; and to provide a pump in which, notwithstanding the automatic control of speed of operation, deliberate manual control of speed is possible.

It is an object of my invention to provide an improved gaseous fluid pumping apparatus. It is another object of my invention to provide an improved gaseous fluid pumping apparatus having an improved automatic speed control means. It is a further object of my invention to provide an improved gaseous fluid pumping apparatus having improved hydraulic speed-responsive mechanism for automatically changing the effective driving gearing therefor when the same is driven at certain predetermined speeds. It is yet another object of my invention to provide an improved gaseous fluid pumping apparatus having improved unloading means. It is still another object of my invention to provide a gaseous fluid pumping apparatus having improved controlling means for governing the operation thereof in accordance with intake pressure variations. It is still another object of my invention to provide an improved gaseous fluid pumping apparatus having improved controlling means therefor including fluid operated, speed-changing driving gearing and fluid operated unloading means both operable by a common operating medium. It is still another object of my invention to provide an improved gaseous fluid pumping apparatus of the rotary type having improved unloading means. It is still a further object of my invention to provide an improved gaseous fluid pumping apparatus having improved means for lubricating the same. A further object of the invention is to provide improved gaseous fluid pumping apparatus having improved governing means. Another object is to provide a compressor having improved speed control means operative to effect a reduction in the speed of the compressor when the compressor speed reaches a predetermined value. Still another object is to provide a compressor connected through drive gearing to power means and having improved control means operative at a predetermined compressor speed for changing the drive gearing to effect a slower driving of the compressor. Yet another object of my invention is to provide a compressor having improved means operating at a predetermined low intake pressure for effecting an increase in the pump discharge pressure. Other objects and advantages of the invention will hereinafter more fully appear.

This application is a division of my copending application Ser. No. 452,299, filed July 25, 1942.

In a preferred embodiment of my invention, a pair of intermeshing rotors may be supported within a casing and operate when driven to deliver air from an intake at one point in the casing to a discharge port at another point in the casing. The rotors may desirably be provided at one end with shafts having gears mounted thereon for transmitting power from a drive shaft to the rotors and for maintaining the rotors out of contact with each other but in such close relation that space packing is provided. A pair of the gears may be alternatively connected in driven relation to the drive shaft for effecting drive of the rotors at different speeds. Desirably, there may be connected to rotate with one of the rotors a speed responsive device for governing a valve mechanism for controlling the flow of an operating fluid relative to a fluid actuated clutch mechanism which is operable to connect one of the two gears last mentioned in driven relation with respect to the drive shaft. At comparatively low rotor speeds, such valve device may desirably operate to supply fluid to the clutch mechanism in such a manner as to effect a connection of that gear which drives the compressor through a high speed gear ratio. When the rotor speeds reach a predetermined value, the speed responsive device desirably operates to vent fluid from the clutch operating mechanism thereby to disconnect the high speed gear and to permit drive to be transmitted through the other of said pair of gears to the rotors. Desirably, manually operated valve means are included for removing the control of the fluid flow from the speed responsive device operated valve and for controlling directly the flow of fluid relative to the clutch mechanism at will. Further, there is desirably associated with the compressor a control mechanism operative when the compressor intake pressure is above a predetermined value to effect compressor dischage at a relatively low pressure, and in a preferred form, without any compression, while upon a predetermined decrease in the intake pressure the control means operates to preclude discharge by the compressor without a substantial compression of the fluid taken into the same. Desirably, such control device may take the form of a valve mechanism for controlling an auxiliary discharge opening arranged in such relation to the casing that the same has communication with the rotor pockets well prior to the attainment of said pockets to the normal discharge opening, and a valve device for controlling such opening. Advantageously the valve device may be controlled by lubricant pressure provided by the lubricating system of the compressor.

Further in the preferred embodiment there may be a common hydraulic system for the speed control and compressor discharge pressure control mechanisms of the compressor unit, such hydraulic system preferably utilizing the lubricant of the compressor whereby a single pump may supply pressure for operating change speed gearing and valve mechanism for controlling the compressor delivery pressure and supply the lubricant to the lubricated portions of the compressor.

In the accompanying drawings there are shown for purposes of illustration one form and a modification which the invention may assume in practice.

In these drawings,

Fig. 1 is a side elevation of the complete apparatus.

Fig. 2 is an end elevation of the apparatus of Fig. 1, viewed from the left-hand end of Fig. 1 and showing the drive end of the apparatus.

Fig. 3 is an opposite end elevation of the apparatus shown in Fig. 1, being an illustration of the right-hand end thereof.

Fig. 4 is an enlarged central longitudinal vertical section on the plane of the line 4—4 of Fig. 2.

Fig. 5 is an enlarged horizontal fragmentary sectional view on the plane of the line 5—5 of Fig. 3, showing a detail of the hydraluic system.

Fig. 6 is a horizontal longitudinal sectional view on the planes of the line 6—6 of Fig. 4, with parts shown in elevation.

Fig. 7 is a view showing portions of the unloading mechanism shown in Fig. 6 in different positions and with certain additional parts shown in elevation.

Fig. 8 is a vertical sectional view on the plane of the line 8—8 of Fig. 6, with parts shown in full.

Fig. 9 is a vertical transverse sectional view on the plane of the line 9—9 of Fig. 6, showing a detail of construction of the unloading mechanism.

Fig. 10 is an enlarged fragmentary sectional view showing venting means for the unloading valve operating cylinder, the view being taken substantially on the plane of the line 10—10 of Fig. 1.

Fig. 11 is an enlarged horizontal sectional view through the control mechanism at the right-hand end of the apparatus, the view being taken on the same plane as Fig. 6.

Fig. 12 is a fragmentary vertical transverse section on the plane of the line 12—12 of Fig. 11, showing a manually operable control valve positionable to vary the speed of drive of the pumping apparatus.

Fig. 13 is a section on the lines 13—13 of Fig. 12.

Fig. 14 is an enlarged detail sectional view on the axis of the speed-responsive device for controlling the speed of drive of the apparatus.

Fig. 15 is a transverse sectional view taken on the plane of the line 15—15 of Fig. 14.

Fig. 16 is a fragmentary view generally similar to Fig. 14 but with parts shown in elevation and illustrating a different position of the parts.

Fig. 17 is a detail longitudinal sectional view on the plane of the line 17—17 of Fig. 15.

Fig. 18 is a fragmentary detail view showing a locking screw for the governor.

Fig. 19 is an enlarged horizontal sectional view on the same plane as Fig. 6, showing details of construction of the external pressure-responsive unloader valve controlling pilot mechanism.

Fig. 20 is a fragmentary view on the same plane as Fig. 19, showing the parts in different relative positions.

Fig. 21 is an enlarged transverse vertical section on the plane of the line 21—21 of Fig. 4.

Fig. 22 is a longitudinal view on the line 22—22 of Fig. 21.

Fig. 23 is an enlarged fragmentary sectional view on the plane of Fig. 4, showing details of the speed-controlling drive clutch.

Fig. 24 is a vertical sectional view on the plane of the line 24—24 of Fig. 4, showing a portion of the driving gearing.

Fig. 25 is an enlarged transverse fragmentary sectional view showing a detail of the drive mechanism.

Fig. 26 is a fragmentary section on the plane of the line 26—26 of Fig. 25, showing a detail of a roller ratchet.

Fig. 27 is a section on the line 27—27 of Fig. 25, showing another detail of the roller ratchet mechanism.

Fig. 28 is a vertical sectional view on the plane of the line 28—28 of Fig. 6, showing the high pressure head of the pump.

Fig. 30 is a vertical sectional view on the plane of the line 30—30 of Fig. 4, showing the intake end of the rotor chamber.

Figure 31:
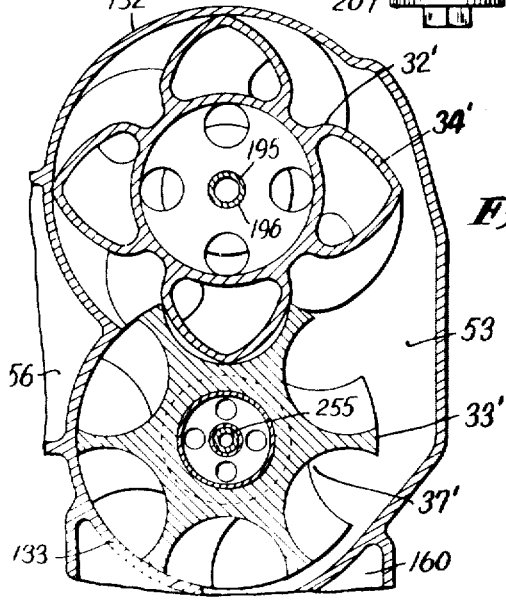
Fig. 31 is a view similar to Fig. 29, showing a modification.

In the preferred embodiment of the invention shown, the pumping apparatus, generally designated C, comprises a main casing part 31 and a pair of coacting rotors 32 and 33. The rotor 32 is a male rotor and comprises four helically arranged lobes 34, the rearward sides 35 of which are shown as generated curves in profile, while the leading or pressure side 36 of each of these lobes is, in profile, substantially in the form of a circular arc. The female rotor 33 is provided, in the form shown, with six helically arranged grooves 37 each adapted to cooperate with the lobes of the rotor 32, and the leading concave surfaces 38 of the grooves 37 are in profile substantially in the shape of an arc to coact with the arcuate pressure surfaces 36 of the lobes of the rotor 32, while the following concave surfaces 39 of the grooves 37 are generated curves in profile. It will be understood that with a device of this character, a materially shortened sealing line is had for the pockets or working spaces which are formed by the coaction of the rotors with each other. A different form of rotor construction may be used without departing from various aspects of my invention, as for example that construction which is shown in Fig. 31, in which the rotors 32' and 33' have their respective lobes 34' and grooves 37' formed with generated surfaces in a well known manner. With rotors constructed and arranged as illustrated, it will be evident that they will have, as it were, low pressure and high pressure ends.

In either case, the rotors are adapted to operate with space packing; that is to say, they are maintained in such relation to each other, through gearing, that there is no actual contact between the rotors with each other. Each of the rotors 32, 33 is herein shown supported at its ends by stub shafts, the rotor 32 having a stub shaft 40 at its low pressure end and a stub shaft 41 at its high pressure end; while the rotor 33 has a stub shaft 42 at its low pressure end and a stub shaft 43 at its high pressure end. The stub shafts 40 and 42 are supported in suitable bearing sleeves 44 and 45 supported in bores 46, 47 in an integral end casing portion 48 formed in one piece, as herein shown, with the housing 31. A separate, plural-part head 50 supports ball thrust bearings 51 and 52 in which the stub shafts 41 and 43 are respectively mounted. These bearings position the rotors so that no contact can take place between them and the ends of the casing. The casing 31 is provided with an intake chamber 53 with which an intake passage 54 provided with suitable strainer or other devices, not shown, for preventing the ingress of harmful material, communicates, and the intake space communicates with the right hand, low pressure ends of the rotors, and also for a substantial part of the length of the rotors communicates with the back portions thereof so-to-speak, the portions at the opposite side of the plane which includes the rotor axes, from the discharge. The intake chamber 53 also includes curved recesses 53' extending substantial distances arcuately, the extent of these recesses being such that, in the illustrative embodiment shown, the intake chamber and its component recesses 53' provide intake communication with the rotor chambers over arcs of considerably more than 180°. The extent of the intake port, from the functional aspect, is, with the proportions shown, such that the "trailing" edges of the grooves 37 and of the spaces between the lobes 34 pass out of register with the intake port just before engagement or the start of compression within the tooth grooves and spaces begins. It will be evident, however, that a small amount of overlapping, so-to-speak, would be possible and to depend on the dynamic effect of the incoming air to offset the tendency toward a reversal of flow caused by the initial compression. The casing 31 is provided with a discharge chamber 55 at the left hand (high pressure) end of the rotors, and another chamber 56, whose purpose will later be described, communicates with the chamber 55 though it is separated therefrom for a substantial distance by a web 57. The discharge chamber communicates with the high pressure ends of the rotor chambers, as shown in Fig. 28, and also with said ends through a peripheral opening in the rotor casing as indicated by broken lines in Fig. 1.

For the purpose of maintaining the rotors out of contact with each other they are connected by intermeshing helical gears 60 and 61, the gear 60 being splined, as at 62, to the stub shaft 41, and the gear 61 being splined, as at 63, to the stub shaft 43. The gears 60 and 61 are so formed that their helix angles correspond in hand and lead to the helix angles of the rotors to which they are respectively fixed. Regardless of the speed at which the rotors turn, these gears operate to maintain the space packing heretofore referred to; in other words, a very small clearance between the surfaces of the lobes and the sides and bottoms of the grooves of the rotors is maintained, thus preventing wear and permitting the operation of the pump at a speed far exceeding any permissible with rotors running in contact with each other. By reason of the smallness of the clearance maintained and the high speeds of rotation, serious leakage is prevented.

The feature of meshing rotors held out of contact by helical gears of the same hand and lead as the rotors is claimed in my copending application Ser. No. 623,485, filed October 20, 1945.

A drive shaft 70, preferably driven through a flexible non-back-lash drive such as, for example, that disclosed in my application Serial No. 443,414, filed May 18, 1942, now abandoned, is arranged in alinement with the stub shaft 43 and has a driving connection therewith as shown at 71. The drive shaft is journaled by means of a ball bearing 72 carried by the plural-part head 50 and engaging a cylindrical portion 73 on the drive shaft. Its other end is rotatably supported as later described. Surrounding a cylindrical hub portion 79 of the gear 61 is a bearing sleeve 80, and a cylindrical portion 81 at the right hand end of the drive shaft 70 rotatably surrounds the bearing sleeve and is journaled thereon. Keyed to the periphery of the cylindrical portion 81 of the drive shaft is a member 82 having a number of recesses 83 formed therein receiving rollers 84 which are operative, as later described, at times to effect a clutching between the member 82 and a cylindrically bored liner ring 86 keyed, as at 87, to the gear 61. The recesses 83 have relatively straight base surfaces 90 and radial surfaces 91. Through the latter surfaces there project spring-pressed plungers 92 adapted to act upon the rollers 84 and cause them to connect the members 82 and 86 upon predetermined relative rotation between the latter members. Springs 93 act against cross pins 94 and move the plungers 92 against the rollers 84. The pins are supported in end closure or plate members 97 and 98, and the rollers have stems 99 loosely received in openings 100 in the plates 97 and 98. These plates 97 and 98 are supported to turn with the member 82. It will be evident, referring to Figs. 24 and 25, that if the member 82 be driven counterclockwise it will, through the rollers 84, be connected to the liner ring 86 and through the latter drive the gear 61, and by virtue of the connection of gear 61 to shaft 43 drive the rotor 33, while through the meshing of gear 61 with gear 60 and the mounting of gear 60 on shaft 41, rotor 32 will also be driven. If the gear 61 be driven counterclockwise at a greater angular rate than the member 82, it will not be connected to that member and may turn freely in the direction mentioned, relative to it.

It will be noted (Fig. 4) that the stub shaft 41 has another shaft 102 connected with it by means of a splined connector element 103 which has an axial bore 104 for reasons later explained. The left-hand end of shaft 102, as viewed in Fig. 4, is journaled in a ball bearing 106 carried by the plural part head 50, and carries a gear 107 somewhat smaller than the gear 60. A gear 108, somewhat larger than the gear 61, meshes with the gear 107 and is journalled by a ball bearing 110 on a cylindrical portion 111 of the drive shaft 70. It also has a sleeve portion 112, internally splined at 113 and supported by a ball bearing 114 on a further cylindrical portion 115 of the drive shaft 70. Discs 117 connected to the sleeve portion 112 are interleaved with other discs 118 connected by splines 119 to the drive shaft 70, which has a flange 120 adjacent the bearing 114 serving as an abutment for the end one of the interleaved series of discs 117, 118 when these are pressed together to connect the gear 108 to the drive shaft 70. A follower member 122 is slidably supported on a packing ring 123 mounted on the shaft 70 and has an annular outer sleeve portion 124 with whose bore a peripherally packed plate 125 coacts to form a chamber 126 for clutch applying hydraulic pressure. A ring 127 seated in an internal groove in the sleeve portion 124 provides an abutment for a flexed annular spring 128 whose opposite side presses upon the side of the plate 125, and the spring 128 normally maintains the follower member 122 in clutch unloading position.

It may now be noted that when the clutch is loaded, the gear 108 will be connected directly to the shaft 70 and will drive the gear 107 and so the gears 60 and 61, and thus the rotors 32 and 33; and because the gear 61 will then be rotated faster than the member 82, and in the same direction with the latter, there will simply be an overrunning clutch action and no tendency for connection between gear 61 and member 82.

Figure 29:
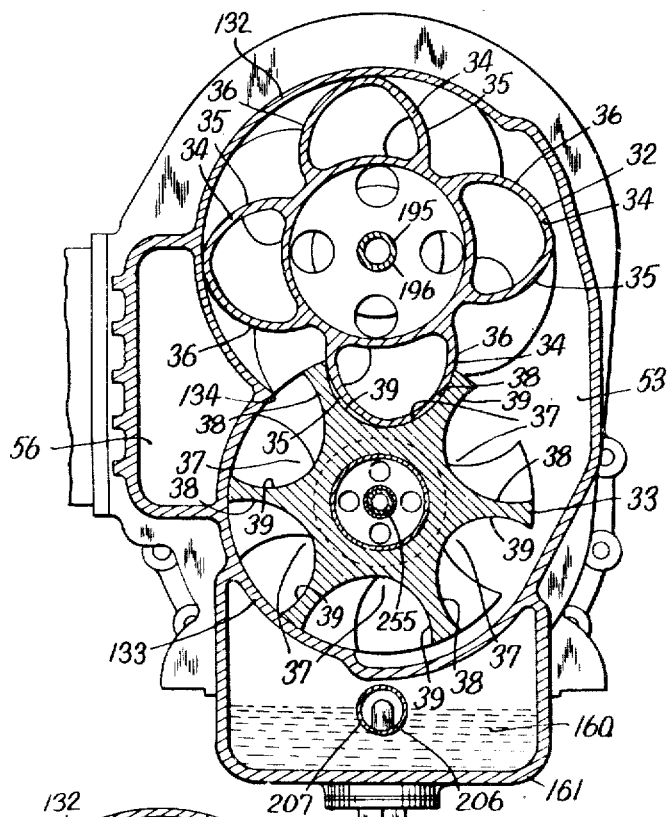
Fig. 29 is a vertical transverse section on the plane of the line 29—29 of Fig. 4.

It will be evident from what has been said that the drive shaft 70 is rotated counterclockwise in Fig. 2 and that the rotors 33 and 33' turn clockwise in Figs. 29 and 31 while the rotors 32 and 32' turn counterclockwise in the same figures, and that air taken in through the intake connection 54 is entrapped between the casing and the rotors and is progressively moved, and if it remains entrapped, compressed as it is moved to the discharge connection 55.

The compressor has automatic means for effecting change in the manner (and accordingly in the speed) of drive thereof governed by a speed responsive device and it has automatic means for effecting the initiation of compressive action thereby governed by the pressure of the air surrounding the airplane. Both of these automatic means are hydraulically operated, so, having described the hydraulic clutch operating means which effects high speed drive of the compressor, I shall briefly describe the hydraulically controlled means for initiating compressive action, and then describe the hydraulic system and its controls which effect the operation of the clutch and the unloading means.

Referring particularly now to Figs. 6, 28, 29, 30 and 31, it will be observed that the casing 31 at the intake side does not fit at all closely to the peripheries of the rotors, and that there are, as previously described, arcuate intake grooves 53' which extend at the intake end of the pump somewhat more than 90° in one case and somewhat less than 90° in the other past the plane which includes the axes of rotation of the rotors, but that there are wall portions respectively marked 132 and 133 which except for clearance adequate to constitute space packing do conform or fit quite closely to the cylinders traced by the outermost portions of the rotors and that these portions 132 and 133 intersect along a line 134 parallel to the rotor axes. Now, the fluid which is "sealed" in the successive progressively diminishing chambers between the rotors and the casing walls would be substantially compressed if no escape or discharge were provided between the times pairs of tooth spaces or grooves move out of communication with the grooves 53' and the instant that the leading edges of the tooth spaces come into communication with the discharge 55; and under certain conditions such compression is very desirable. But under other circumstances it is better to avoid material compression and thus conserve power and avoid unnecessary heating of the cabin. Accordingly, I have provided an opening at 135 so related to the length of the casing and the helix angle of the rotors that when the opening 135 is unobstructed no compression of the fluid enclosed between the rotors 32 and 33 will take place before communication with the opening 135 is had; and the relationship of the opening 135 to the discharge passage 55 is such that the air remaining in the pockets in the rotors as these pockets move out of communication with the opening 135 will not be compressed before these same pockets communicate with the discharge 55. It may thus be noted that the position of the ends of the intake grooves 53' and the position and dimensions of the opening 135 are such that with the helix angles of the rotors used, tooth pockets whose "trailing" edges are just ceasing to communicate with the intake are just about to commence to have their forward edges pass over the opening 135; and that as the "trailing" edges of tooth pockets approach their points of final communication with the opening 135 when the latter is open they have their leading edges pass beyond the edge of the final discharge opening, whereby there is displacement, but not compression, of fluid when the opening 135 is not closed by the valve 136. However, when valve 136 is closed, there is a substantial compression of the fluid between the time the tooth spaces cease to communicate with the grooves 53' and move into communication with the discharge 55.

To control the opening 135, which has a peripheral wall which lies in the surface of a cone, I have provided a valve 136 whose shape is such that when the same is closed it conforms very closely to the walls 132 and 133, as may be seen in Fig. 9. This valve has ears 137 through which pins 138 pass, and these pins are secured in the arms or flanges 139 carried upon a pivotal support member 140 which is secured, by a pivot pin 141, to the wall of the casing 31. A shoulder 142 on the valve and a shoulder 143 on the casing limit the closing movement of the valve 136 to a position in which the walls of said valve conform exactly to the surfaces of the rotor chambers. This valve is adapted normally to be maintained open by a spring 145 engaging at one end the wall of a member 146 which forms a portion of the enclosure of the discharge chamber 56 and which is secured, in any suitable manner, to the casing 61. The other end of the spring acts against a piston 147 having a packing 148 fitting the walls of a cylindrical chamber 149 which is formed in a cylinder-providing member 150 also secured, in any suitable manner, to the casing 31 in a position overlying the member 146. A piston rod or operating stem 152 with an elongated eye 153 is connected at its outer end to the piston 147, and by means of the eye and a pin 154 is connected to the valve 136. The piston 147 and the member 150 cooperate in forming a servo-motor 155 to which fluid may be admitted through a connection or passage 156 under a control hereinafter described, and a leakage port 158, shown in Fig. 10, is provided to conduct any liquid which may escape past the packing 148 to an oil sump 160 in the lower part of the casing 31. When the servo-motor 155 is not under pressure delivered through the passage 156, the valve 136 may be moved to the open position shown in Fig. 7 by the spring 145, and in that inclined position it will offer very little obstruction to the discharge of fluid to the chamber 56 and thence to the interior of the cabin through any appropriate connection. When, however, pressure is supplied under certain predetermined conditions to the servo-motor 155, the piston 147 will be caused, through the operating stem 152 and the pin 154, to close the valve 136, and the compressor will then operate substantially precisely as though there were no opening 135 available. Thus depending upon the position of the valve 136, there is provided by the single unit in effect a mere displacement pump and a compressor capable of substantial compression of air taken in. That this compression may be in practice from one very substantially subatmospheric pressure to a higher one which is itself less than atmospheric does not, of course, alter the fact that there is a definite compression.

As previously indicated, the change in speed of operation of the compressor and the loading and unloading are both hydraulically controlled, and I shall now describe the hydraulic system. There is provided in the base of the casing 31 the sump 160. This sump is disposed between the lower wall of the rotor housing and an outer wall 161 forming an integral part of the casing 31. The chamber is, in the horizontal position of the compressor, substantially horizontal, and a pump of the intermeshing gear type is positioned at the right-hand end of the casing as the same is viewed in Fig. 4, so that it is partially submerged and so that its intake is always submerged (in the horizontal position of the casing) in the oil in the sump. This pump, designated 162, includes a casing 163 having intersecting rotor chambers 164 therein in which are rotors 165 having intermeshing teeth 166 arranged at a slight angle to elements of the cylindrical surface in which the outermost points in the rotor teeth lie. An intake passage 167 conducts oil to the lower sides of the rotors 165, and the oil is carried around by the teeth 166 and is discharged to a discharge space 168 above the plane of the mesh line of the rotors 165. One of the rotors 165 drives the other, and the first mentioned rotor is provided with a shaft 169 which extends through a ported cover plate 170 and carries a gear 171 which is in turn driven by a pinion 172 rotatably supported on a sleeve member 173 later more fully described. A larger gear 174 is herein shown as formed integrally with the gear 172, and the gear 174 is driven by a pinion 175 formed integral with the stub shaft 42 and arranged at the extreme right-hand end of the latter in Fig. 4. A clean-out plug 176 is arranged below the oil pump in the bottom of the sump. The discharge passage 168 communicates with passages 178 in the cover 170, and 179 in a supplemental cover, and opens into the bore 180 of the sleeve member 173 previously described. From this latter the fluid is discharged through branch passages 181 into a chamber 182 containing a strainer structure 183. Between the ends of the chamber 182 and suitably associated with the strainer is an annular peripheral member having a peripheral groove 184 to which the strained lubricant obtains access through radial ports 185. The annular groove 184 communicates with a passage 186 which opens into an annular groove 187 surrounding the bearing bushing 45. The opposite side of the annular groove 187 opens into a passage 188 whose upper end opens into a chamber 189. The chamber 189 constitutes a distribution point for oil for lubricating purposes and for operating the speed-changing clutch mechanism previously described and also for fluid for closing the valve 136 previously mentioned. In line with the passage 188 there is another passage 190 opening outwardly and upwardly from the chamber 189. This communicates with an annular groove 192 in the bushing 44. The annular groove has continuously in communication with it obliquely disposed passages 193 opening into a chamber 194 in the stub shaft 40. The chamber 194 is connected by a tube 195 suitably centered as at 196 within the rotor 32, and at the left-hand margin of Fig. 4 the tube 195 opens into a chamber 197 in the stub shaft 41. As will be apparent from what has been previously described, the chamber 197 communicates through the passage 104 with a hollow interior 198 of the shaft 102 and discharges through the left-hand end of the latter, as shown in Fig. 4, into a chamber 199 formed in the multipart head structure 50. Fluid is delivered from the chamber 199 through a lubricant tube 200 into a chamber 201 between the rotor casing and the chamber 199 and which forms an enclosure for the motor driving gear earlier described. The lubricant tube 200 has two discharge orifices 202 and 203 which respectively discharge lubricant onto the peripheral surfaces of the couples 107, 108 and 60, 61 thereby keeping the gear couples 60, 61 and 107, 108 adequately lubricated. The lubricant, after its discharge over these gears, passes downwardly within the chamber 201 and is conducted out of the casing through a passage 205 and a tube 206 of small diameter opening through the side wall of a larger tube 207 back into the sump 160. Lubricant is also discharged directly through the tube 207 back into the sump 160. The presence of the branch tube 206 of small diameter prevents all of the lubricant in the sump 160 from flowing into the chamber 201 when the airplane has occasion to make a dive and interfering with the operation of the drive mechanism for the rotors. Another drain plug 208 is arranged in a position to permit the draining of lubricant from the chamber 201.

It will be noted that in the stub shaft 40 there is, at the right-hand end of the chamber 194, a partition 210 to the right of which there is a valve-receiving bore 211. Other obliquely extending passages 212 connect the annular grooves 192 with the bore 211 at points near the partition 210, and a further annular passage 213 formed in the bushing 44 is connected with the interior of the bore 211 by radial passages 214. Suitably supported on the rear end of the stub shaft 40 is a mounting 215 for a speed-responsive governor 216 which serves in conjunction with a spring 217 housed in the interior of a valve member 218, to vary the position of that valve member in the bore 211. The valve member will be observed to be open from end to end, as at 220, and to house the spring 217 within it in such a manner that the spring acts on the right-hand end of the valve in Fig. 14 at one end and at its other end acts on the partition or wall 210. The valve has a left-hand end collar 222, another annular peripheral collar 223 spaced by a groove 224 from the collar 222 and a further enlarged collar—right-hand portion 225—spaced by a peripheral groove 226 of substantial length from the collar portion 223. The support member 215 has a portion 227 guidingly engaging the head 225 and is traversed by openings 228 so that in certain positions of the valve 218 there may be a discharge into a chamber 230 at the right-hand end of the compressor, of fluid entering the chamber 211 through the radial passages 214.

The governor support 216 includes fly weights 232 pivotally supported on transverse pins 233 in earlike portions 234 carried by the support 215. Portions 235 of the fly weights at the opposite side of the pivots thereof from the main masses of said fly weights carry adjustable screw devices 236 which have heads 237 adapted to engage the end surface of the head 225, and upon the attainment of the shaft 40 to a predetermined speed of rotation the fly weights actuate the portions 236 to move the valve 218 to shift the valve from the position shown in Fig. 14 to that shown in Fig. 16, thereby allowing fluid entering the bore 211 through the radial passages 214 to be vented while at the same time preventing any delivery of fluid from the pump to the radial passages 214. The cutting off of the supply of fluid to the radial passages 214, and the venting of fluid from these passages through the bore 211 will effect, as shortly described, a reduction in the speed of the rotors. This reduction in speed, however, will not be sufficient to effect an operation of the speed governor permitting the valve to move again to a position for supplying fluid to the passages 214, as the design of the governor is such that it becomes operative to force the valve 218 to the left only upon the attainment of a speed as of the order of 7000 R. P. M., while after once assuming the position of Fig. 16 a falling off of the speed to a lower speed of the order of 4000 R. P. M. will be necessary before the weights will be moved in and permit the reestablishment of fluid delivery to the chamber 126 of the hydraulically operated clutch mechanism.

The circumferential groove 215 is connected below the stub shaft 40 with a passage 241 which extends downwardly parallel to the axis of the passage 190 and opens through an opening 242 into the interior of the bore of a valve-receiving bushing 243. This valve-receiving bushing contains a rotatable valve 244, which is used primarily for testing purposes and which has an operating handle 245 by means of which the valve may be turned into any one of three different positions. In the position of the valve 244, shown in Fig. 4 and in Fig. 11, a diametric passage 246 connects the opening 242 with an opposite opening 247 in the valve sleeve and via the latter opening to the passage 248 which is connected through a port 249 in the bearing sleeve 47 and an annular groove 250 and radial passages 251 with a chamber 252 within the interior of the stub shaft 42. The outer end of this chamber 252 is closed by a plug 253, while the other end of the chamber 252 is connected by a suitably centered tube 255 with arrangements for effecting the operation of the clutch mechanism previously described and for the performance of certain lubricating functions. Before proceeding with the description of this mechanism, it may be pointed out that the valve 218 at speeds of the rotor 32 below a predetermined number of R. P. M. will be in the position shown in Figs. 4 and 14 and will connect the pump discharge through the ports and passages previously described with the tube 255, but that at speeds above such a predetermined number of R. P. M. the valve 218 will assume the position shown in Fig. 16 and cut off communication completely between the passages 190 and 241 and to vent 241 back to the sump through the chamber 230. Now it will be observed, referring particularly to Fig. 4, that at the rear end of the tube 255 there is a bell or funnel shaped member 257 fitting the bore 256 of the stub shaft 43, and that a split spring ring 259 operates to prevent possible movement of the member 257 out of the bore in the stub shaft if any loosening should occur. Within a stepped bore 260 within the drive shaft 70 there is arranged a hollow plunger member 261 which is provided at one end with a perforated flange 262 adapted to seat against a split ring 263 secured within the inner wall of the drive shaft 70. The plunger member 261 is engaged by a spring 264 which reacts against a shoulder 265 within the drive shaft, and a thimble 266 closes the left-hand end of the chamber within which the element 261 is movable. The interior of the chamber communicates, through obliquely radially extending passages 267, with the outside of the drive shaft between the ball bearings 72 and 110. Other radially obliquely extending passages 268 connect the interior of the stepped bore 260 at the right-hand end of the plunger member 261 in communication with the chamber 126.

The mode of operation of the mechanism which has just been described is as follows: When the compressor is started, a driving connection is immediately established between the shaft 70 and the gear 61 and the pump 182 commences to deliver fluid through the strainer, through the passage 186, the chamber 189, the passage 190, the oblique passages 212, the annular groove 224, the radial passages 214, passages 241, 246, 248, 251 and the tubular conduit 255 to the interior of the member 257 and to the space between that member and the plunger member 261. The fluid immediately passes through the perforations in the flange 262 and through the radial passages 268 into the chamber 126 and brings the clutch discs 117 and 118 into contact with each other As the oil continues through the tube 255, the member 261 moves to the left compressing the spring 264, and the compression of this spring is so determined that the clutch pressure will be gradually applied as the member 261 moves to the left. When this member reaches its extreme left-hand position, the clutch discs may be firmly pressed against each other and drive of the rotors at the higher speed, when the gear 108 is the driving element, will be effected. It will be appreciated that this high speed driving will be continued until the speed of the compressor builds up to such a degree that the valve 218 will be shifted by the governor, and then the slower speed drive between the shaft 70 and the compressor will be initiated. It will be noted that lubricant will be supplied from the space between the member 251 and the member 257 to the splines.

The feature of the control means for the clutch comprising discs 117 and 118 is claimed in my copending application Ser. No. 80,844, filed March 11, 1949.

The manually operable valve 244 previously mentioned can be adjusted as previously described to such a position as to restore high speed drive of the compressor after such high speed drive has been automatically interrupted, or to prevent interruption of high speed drive upon the attainment of the predetermined speed of operation at which a shift to low speed drive is normally effected. Furthermore, in another position of adjustment, this valve may be so operated as to preclude the high speed drive completely. It will be noted that in addition to the diametric passage 246 formed in the valve there is a longitudinal peripheral passage 270 which opens into the space 271 at the right-hand side of the valve, a space which is connected by a passage 272 (Fig. 4) with the chamber 230 which communicates with the sump. When the valve 244 is turned to bring the passage 270 into communication with the passage 248 and to blank off the port 242 with the cylindrical portion of the valve opposite the groove 270, it will be evidently impossible to transmit pressure through the tube 255 for effecting high speed drive of the compressor. The valve 244 also has an oppositely extending longitudinal peripheral groove 274 opening through its end which forms a portion of the bounding wall of the chamber 189. When the valve is turned so as to bring the passage 274 into communication with the passage 248, fluid will be supplied from the chamber 189 continuously to the passage 248 and the tube 255 and high speed drive of the compressor will alone be possible. Referring to Figs. 3 and 4, it will be apparent that means is provided for locking the handle 245 of the valve 244 either in mid position where the drive of the compressor is controlled by its speed automatically by the speed governor or in either of the other two positions mentioned.

The chamber 189 has a laterally extending passage 276 communicating with the same. This passage is adapted to be connected by a longitudinally extending passage 277 under the control of a spring loaded valve 278 with a passage 279 opening into an annular chamber 280 which surrounds the sleeve 243 and which is connected at its opposite side with a passage 281. The function of the spring loaded valve 278 is to maintain a sufficient pressure in the chamber 189 under all circumstances when the compressor is running to insure the operation of the speed change mechanism. The passage 281 has a bore 282 communicating with it, and a valve 283 reciprocates in the bore. A side vent 284 opens out of the bore and leads into the space 230, and a spring 285 having an adjustable follower 286 is adapted to control the pressure in the passage 281. The passage 281 communicates through a port 288 with a bore 289 of a valve seat member 290 mounted in a passage 291 which is connected by another passage 292 to the passage 156 leading to the chamber 155 to which fluid is supplied to actuate the valve 136. It will be evident that if through-escape from the bore 289 is prevented fluid will be supplied to the servo-motor 155 at a pressure determined by the valve 283 and that again, subject to the same condition, the valve 136 would be closed whenever the pump 162 was being driven. However, means is provided whereby the pressure is vented freely from the bore 289 back to the sump at all times when the airplane is operating at levels where the external pressure is above a predetermined amount. It will be observed that the valve seat member 290 is provided with a plurality of ports 294 opening through a surface surrounded by an annular valve seat 295 and that there is further provided a central guide extension 296. Reciprocably mounted upon this guide extension is a valve element 297. As is best seen in Figs. 19 and 20, the movement of this valve element in an opening direction is limited by a sleeve portion 298 formed on a threaded sleeve member 299 which is supported in a further sleeve mounting element 300 carried by a wall of the casing 31. An adjustable closure element and spring tension regulator 301 engages a spring 302 which acts upon the valve 297 and normally tends to seat it. Connected to the valve 297 and to the sleeve member 299 at opposite sides of the sleeve portion 298 are bellows devices 303 and 304 bounding a chamber 305 in which the sleeve 298 is enclosed, and this sleeve is perforated so that free communication may at all times exist throughout the interior of this chamber. The chamber 305 is evacuated, and the compression of the spring 302 is so determined that until the pressure acting upon the exterior of the bellows arrangement falls to a predetermined low value, the valve 297 will be held firmly open against the stop sleeve 298. When, however, the pressure in the casing 300 falls below a predetermined value, the valve 297 will promptly seat and interrupt the discharge of fluid back to the sump and cause the building up of such a pressure in the chamber 155 as to close the valve 136 and cause the compressor to operate as a "compressor" instead of a displacement means. It will be noted that the walls of the casing 300 are perforated as at 309, 310 to permit the fluid passing through the passages 294 to flow freely to the sump through the chamber 230. The chamber 230 is connected to external pressure—pressure outside the cabin—through a pressure device of any suitable construction as shown at 311, and a similar device, 311', connects the chamber 201 to atmosphere. Thus the casing 300 serves as a vent line to atmosphere, so that opening and closing of the vent line is effected according to a terminal pressure condition of the compressor, namely, in this case, the intake pressure. The setting of the spring 302 is such that the valve 297 is normally open at heights of the airplane below 25,000 feet. The valve 297 is of the "overbalanced" type, being of the sharp opening variety, so that when the valve 136 is to open, it may be permitted to open sharply and cleanly. Extending axially through the guide extension 296 is a passage 312 through which fluid passes from the bore 289 to the interiors of the sleeve member 299 and the bellows device 304. When the valve 297 is seated, fluid supplied under pressure through the passage 312 acts against the outer end of the valve and counteracts the increase in pressure on the inner end of the valve produced by the fluid acting through the ports 294.

It will be noted that the rotor 33 is hollow from end to end and that passages 313, 314 connect the space surrounding the left-hand stub shafts 41, 43 with the interior of the rotor, while passages 315 extend through the stub shaft 42, so that any tendency of lubricant to enter the rotor spaces is prevented by pressure equalization. The casing 31 has cooling fins 316.

An extended summary of the mode of operation of the illustrative embodiment and modification of the invention which have now been described in detail is not necessary in view of the explanations given of the modes of operation of the component parts. It may be noted, however, that when the airplane takes off the compressor will have the valve 136 open and will simply move large quantities of air at take-off conditions into the cabin. The cabin will be provided with suitable automatic vent mechanism, such for example, as that which forms the subject matter of my application Serial No. 443,513, filed May 18, 1942, for Pressure control devices, so that the cabin pressure will not build up objectionably. When the compressor is caused to rotate, it will be started initially at the slower speed, drive being from the drive shaft 70 through the automatic roller clutch mechanism to the gear 61. As soon as the compressor has operated long enough to produce the necessary oil pressure in the system—a thing which occurs almost instantly—the high speed drive of the compressor rotors will be initiated unless the manual control valve 244 should have been moved to prevent this—an unlikely condition as this valve is used mainly for test purposes. Obviously, if a substantial period of idling is desired prior to take off, this valve could be so manipulated as to prevent the needless displacement of air by the compressor. As soon as the compressor driving speed attains to a certain predetermined number of R. P. M., the automatic speed governor mechanism will shift the valve 218 to substitute the low speed drive for the high speed drive by interrupting the supply of clutch loading pressure to the friction clutch loading member 122. Thus during the relatively high speed operation of the compressor during flight the low speed drive will be in operation. The nature of the governor is such as to avoid hunting, and when the speed of the compressor is brought up to a value sufficient to initiate low speed drive there will be required a greater reduction in speed than will be occasioned by the change from one drive to the other before the compressor will again shift back to the high speed drive. If the airplane rises to the requisite height so that compression of the air instead of displacement thereof is necessary for satisfactory operation, the evacuated bellows will permit the closing of the valve 297 and there will be fluid supplied to the piston 147 of the servo-motor 155, and the valve 136 will be closed and the compressor will then operate to compress the fluid, and all of the fluid taken in will be discharged through the regular discharge passage 55. It will be evident that the compressor will be adequately lubricated at all times and that a pump of the character shown has such capacity for the moving of lubricant that a very effective delivery of lubricant to the points requiring lubrication will be assured.

As a result of this invention it will be noted that a novel air pump or compressor is provided having novel control mechanism. It will further be evident that by the provision of the novel construction and arrangement of parts, an air pump or compressor is provided which is extremely compact and relatively light in weight. It will also be noted that by the novel manner of association of the pump and its control mechanism with the cabin of an airplane it is, through association with automatic vent valve devices such as the one disclosed in application Ser. No. 443,413, possible automatically to regulate the cabin pressures to accommodate for any changes in air pressures externally of the cabin, thereby to enable the airplane to operate at relatively great heights, or at any lower ones. The novel control features of the invention enable an airplane to operate at high altitudes with safety and with comparative comfort for the cabin occupants and with good economy. Other uses and advantages of the invention will be obvious to those skilled in the art.

This application is a division of my application Serial No. 452,299, filed July 25, 1942, Air pumping apparatus.

While there are in this application specifically described one form and a modification which the the invention may assume in practice, it will be understood that this form and the modification are shown for purposes of illustration and that the invention may be further modified and embodied in various other forms without departing from its spirit or the scope of the appended claims.

What I claim as new and desire to secure by Letters Patent is:

1. In a compressor, in combination, a casing containing intermeshing rotors of the helical lobe and groove type, an intake port at one end of said casing, a discharge port at the opposite end of said casing, an auxiliary discharge port between the ends of said casing, valve means actuated by fluid supplied under pressure for closing said auxiliary discharge port, passage means for conducting fluid to said valve means, means for supplying fluid under pressure to said passage means, a vent line connecting said passage means freely to exhaust, and valve means responsive to compressor intake pressure for closing said vent line.

2. In an air compressor, in combination, a casing containing intermeshing rotors of the helical lobe and groove type, an intake port at one end of said casing, a discharge port at the opposite end of said casing, an auxiliary discharge port between the ends of said casing, valve means actuated by fluid supplied under pressure for closing said auxiliary discharge port, passage means for conducting fluid to said valve means, means for supplying fluid under pressure to said passage means, a vent line connecting said passage means freely to exhaust, and valve means responsive to compressor intake pressure and operative at a predetermined sub-atmospheric pressure for closing said vent line.

3. In combination, an air compressor of the intermeshing helical rotor type including a casing and intermeshing rotors, intake means, and a discharge opening into communication with which the pockets formed by the coaction of the rotors come at the end of a predetermined range of compression, said casing having another discharge opening which the pockets formed by the coaction of the rotors reach before they attain to the first mentioned discharge opening, a valve for closing said second discharge opening, a conduit for conducting liquid to the valve, means for supplying liquid under pressure to the conduit, a single vent line connecting the conduit freely to exhaust, and a vent line-control valve responsive to compressor intake pressure and operative at a predetermined sub-atmospheric pressure for closing said vent line.

4. In combination, a compressor of the intermeshing helical rotor type including a casing and intermeshing rotors, intake means, and a discharge opening into communication with which the pockets formed by the coaction of the rotors come at the end of a predetermined range of compression, said casing having another discharge opening which the pockets formed by the coaction of the rotors reach before they attain to the first mentioned discharge opening, a valve for closing said second discharge opening, and hydraulically operated, valve-controlled means operated by liquid supplied thereto for actuating said opening-closing valve to closed position and a valve for venting liquid from said last mentioned means, said vent valve normally open, but closed when intake pressure falls below a predetermined value.

WIN WITHERS PAGET.

REFERENCES CITED

The following references are of record in the file of this patent:

UNITED STATES PATENTS

| Number | Name | Date |
|---|---|---|
| 397,337 | Bullard | Feb. 5, 1889 |
| 1,111,498 | Rotter | Sept. 22, 1914 |
| 1,177,898 | Rimmer | Apr. 4, 1916 |
| 1,669,050 | Grant | May 8, 1928 |
| 1,686,505 | Stastny | Oct. 2, 1928 |
| 2,044,867 | Woodard | June 23, 1936 |
| 2,111,568 | Lysholm et al. | Mar. 22, 1938 |
| 2,174,522 | Lysholm | Oct. 3, 1939 |
| 2,217,364 | Halford et al. | Oct. 8, 1940 |
| 2,307,251 | Woods et al. | Jan. 5, 1943 |
| 2,316,416 | Gregg | Apr. 13, 1943 |
| 2,358,815 | Lysholm | Sept. 26, 1944 |

FOREIGN PATENTS

| Number | Country | Date |
|---|---|---|
| 384,355 | Great Britain | Dec. 8, 1932 |